US008781156B2

(12) United States Patent
Dernis et al.

(10) Patent No.: US 8,781,156 B2
(45) Date of Patent: *Jul. 15, 2014

(54) VOICE-BODY IDENTITY CORRELATION

(75) Inventors: Mitchell Dernis, Seattle, WA (US);
Tommer Leyvand, Seattle, WA (US);
Christian Klein, Duvall, WA (US);
Jinyu Li, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,725

(22) Filed: Sep. 10, 2012

(65) Prior Publication Data

US 2012/0327193 A1 Dec. 27, 2012

Related U.S. Application Data

(63) Continuation of application No. 12/692,797, filed on Jan. 25, 2010, now Pat. No. 8,265,341.

(51) Int. Cl.
*G06K 9/00* (2006.01)
*G06F 17/30* (2006.01)
*G10L 17/10* (2013.01)

(52) U.S. Cl.
CPC ...... *G06K 9/00892* (2013.01); *G06F 17/30787* (2013.01); *G10L 17/10* (2013.01)
USPC ........................ 382/100; 704/200; 379/88.01

(58) Field of Classification Search
USPC ......... 382/100, 115, 116, 117, 118, 181, 207; 704/200, 208, 246–257, 260; 381/110; 379/67.1, 80, 88.01
See application file for complete search history.

(56) References Cited

U.S. PATENT DOCUMENTS

| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |

(Continued)

FOREIGN PATENT DOCUMENTS

| CN | 1423487 | 6/2003 |
| CN | 101254344 B | 6/2010 |

(Continued)

OTHER PUBLICATIONS

English Abstract for CN1423487 published Jun. 11, 2003.

(Continued)

*Primary Examiner* — Anand Bhatnagar
(74) *Attorney, Agent, or Firm* — Judy Yee; Peter Taylor; Micky Minhas

(57) ABSTRACT

A system and method are disclosed for tracking image and audio data over time to automatically identify a person based on a correlation of their voice with their body in a multi-user game or multimedia setting.

18 Claims, 11 Drawing Sheets

(56) References Cited

U.S. PATENT DOCUMENTS

| | | |
|---|---|---|
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A * | 9/1994 | Nitta ............................ 348/14.1 |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A * | 2/1996 | Ritchey ........................ 345/420 |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,761,329 A * | 6/1998 | Chen et al. ................... 382/116 |
| 5,764,779 A * | 6/1998 | Haranishi ..................... 381/71.1 |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,593,956 B1 * | 7/2003 | Potts et al. ................... 348/14.09 |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,721,706 B1 * | 4/2004 | Strubbe et al. ................ 704/275 |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,941,274 B1 | 9/2005 | Ramachandran et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,130,446 B2 * | 10/2006 | Rui et al. ...................... 382/103 |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,492,367 B2 | 2/2009 | Mahajan et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,627,139 B2 | 12/2009 | Marks et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |

(56) References Cited

U.S. PATENT DOCUMENTS

| | | | |
|---|---|---|---|
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,801,726 B2 * | 9/2010 | Ariu | 704/243 |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,155,394 B2 * | 4/2012 | Allegra et al. | 382/115 |
| 8,422,695 B2 * | 4/2013 | Namba et al. | 381/94.1 |
| 2003/0200217 A1 | 10/2003 | Ackerman | |
| 2004/0261097 A1 | 12/2004 | Hanks | |
| 2004/0263636 A1 | 12/2004 | Cutler et al. | |
| 2006/0075422 A1 * | 4/2006 | Choi et al. | 725/18 |
| 2008/0026838 A1 * | 1/2008 | Dunstan et al. | 463/30 |
| 2008/0152191 A1 | 6/2008 | Fujimura et al. | |
| 2008/0252596 A1 | 10/2008 | Bell et al. | |
| 2009/0077504 A1 | 3/2009 | Bell et al. | |
| 2009/0141933 A1 | 6/2009 | Wagg | |
| 2009/0215533 A1 | 8/2009 | Zalewski et al. | |
| 2009/0221368 A1 | 9/2009 | Yen et al. | |
| 2010/0093435 A1 | 4/2010 | Glaser et al. | |

FOREIGN PATENT DOCUMENTS

| | | |
|---|---|---|
| EP | 0583061 A2 | 2/1994 |
| EP | 0640953 | 3/1995 |
| JP | 08044490 A1 | 2/1996 |
| JP | 2006123161 | 5/2006 |
| WO | 93/10708 A1 | 6/1993 |
| WO | 9416406 | 7/1994 |
| WO | 97/17598 A1 | 5/1997 |
| WO | 99/44698 A1 | 9/1999 |
| WO | WO2009059065 | 5/2009 |

OTHER PUBLICATIONS

English Abstract for JP2006123161 published May 18, 2006.

Office Action dated May 17, 2013 in Chinese Patent Application No. 201110033245.0.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Shivappa, et al., "Person Tracking With Audio-visual Cues Using the Iterative Decoding Framework," IEEE 5th International Conference on Advanced Video and Signal Based Surveillance, 2008, pp. 260-267.

Toyama, et al., "Probabilistic Tracking in a Metric Space," Eighth International Conference on Computer Vision, Vancouver, Canada, vol. 2, Jul. 2001, 8 pages.

Chetty, "Multi-Level Liveness Verification for Face-Voice Biometric Authentication", Biometric Consortium Conference, 2006 Biometrics Symposium, 2006, pp. 1-6, http://ise.canberra.edu.au/html/MWagner/Papers/2006/O03.pdf.

Marchegiani, "Multimodal speaker recognition in a conversation scenario", Technical Report 7, Jun. 16, 2009, http://209.85.229.132/search?q=cache:http://padis2.uniroma1.it:81/ojs/index.php/DIS_TechnicalReports/article/view/3814/3742.

Sajo, "Turk-2, a multi-modal chess player", Apr. 4, 2009, 20 pages, http://www.inf.unideb.hu/~sajolevente/turk2/turk2.pdf.

(56) References Cited

OTHER PUBLICATIONS

Fransen, "Using Vision, Acoustics, and Natural Language for Disambiguation", ACM/IEEE International Conference on Human-Robot Interaction, Proceedings of the ACM/IEEE international conference on Human-robot interaction, 2007, pp. 73-80, ACM, New York, NY, USA.

Notice of Allowance and Fee(s) Due dated Jul. 5, 2012 in U.S. Appl. No. 12/692,797.

Response to Office Action dated Oct. 8, 2013 in Chinese Patent Application No. 201110033245.0.

English language Summary of, and English translation of claims as amended in, Response to Office Action dated Oct. 8, 2013 in Chinese Patent Application No. 201110033245.0.

Supplementary European Search Report dated Jan. 31, 2014 in European Patent Application No. EP11734991.

Kepesi et al., "Audio-Visual Feature Extraction for Semi-Automatic Annotation of Meetings", 2006 IEEE Workshop on Multimedia Signal Processing, Oct. 6, 2006, pp. 207-211.

* cited by examiner

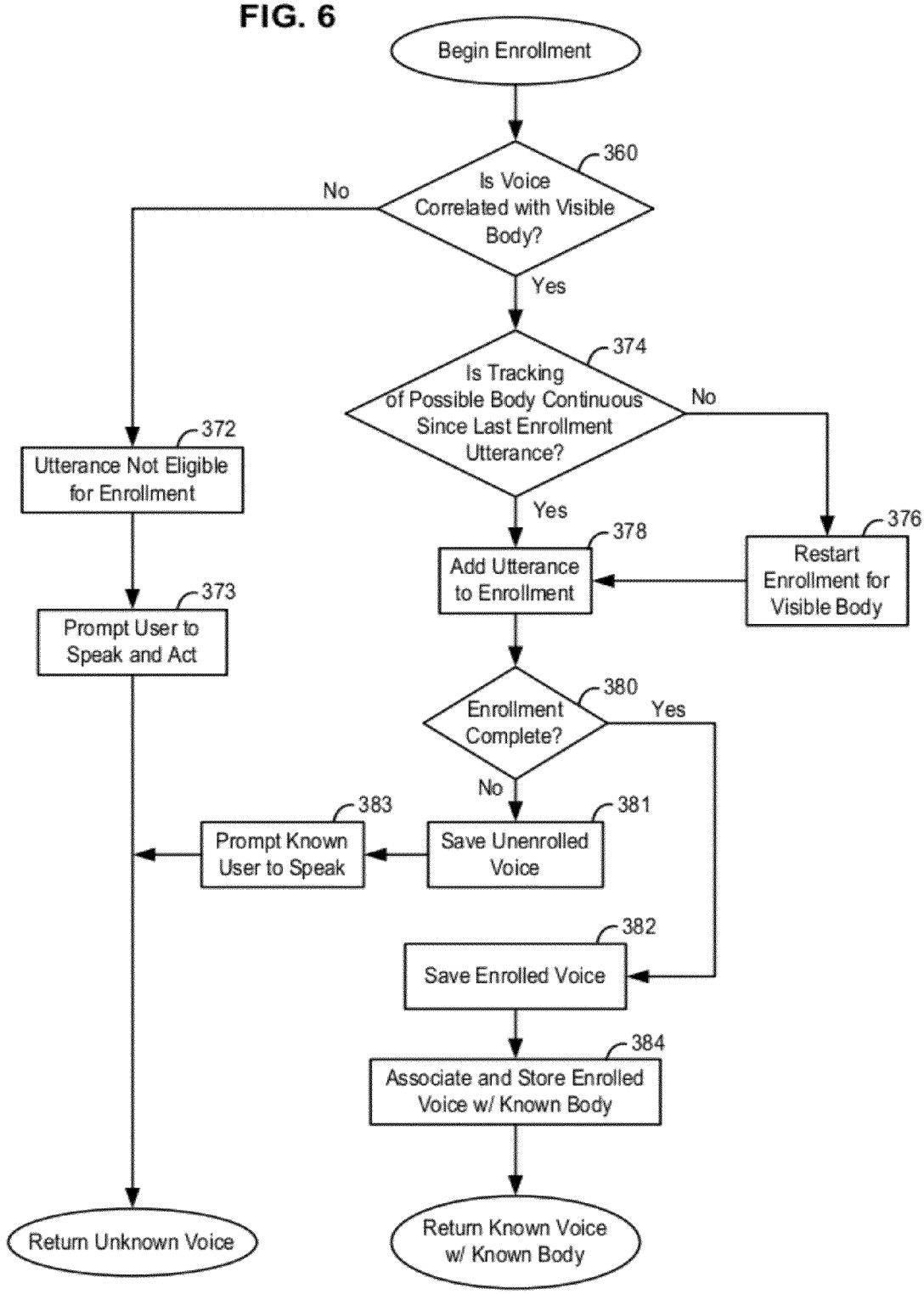

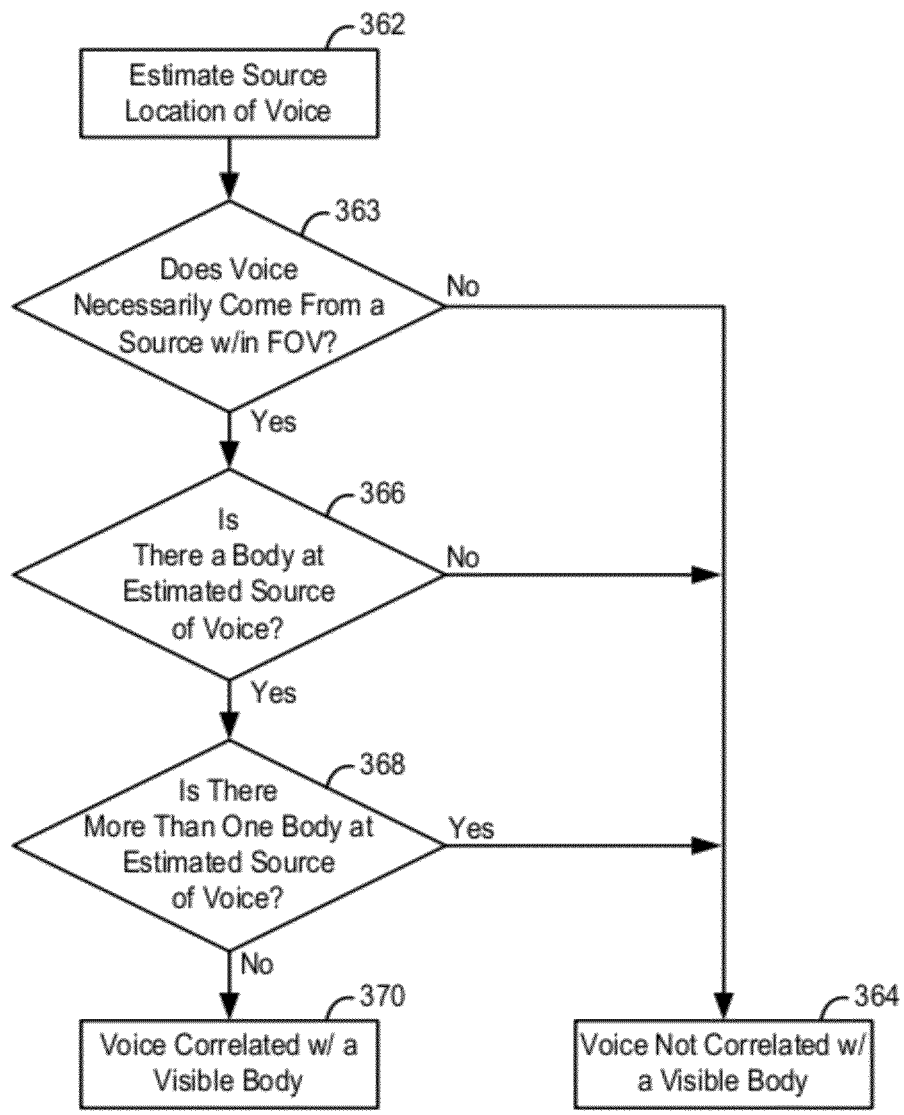

VOICE-BODY IDENTITY CORRELATION

CLAIM OF PRIORITY

This application is a continuation application of U.S. patent application Ser. No. 12/692,797, entitled "VOICE-BODY IDENTITY CORRELATION," filed Jan. 25, 2010, which application is incorporated herein by reference in its entirety.

BACKGROUND

Systems such as computer games and multimedia applications have evolved to the point where the systems are able to utilize user movement and verbal communication as inputs to the system. Such natural systems may be geared toward multiple users, where it is compelling to distinguish individuals from one another. Techniques exist to allow a game or application to identify users within the field of view through a variety of mechanisms, including a three-dimensional depth camera capable of sensing user traits such as size, facial features, clothing color, etc. Voice recognition techniques also exist to identify perceived user voices through a variety of mechanisms including a microphone array. These two techniques have not conventionally been used in tandem. It would be compelling to automatically match user voices with bodies without involving a deliberate setup on the part of the users. For example, it may happen that a person's identity is ambiguous using imaging techniques alone or audio techniques alone. This is especially true in lower cost consumer systems. In addition to helping to disambiguate users, such a correlation of audio and visual identity can be used to bolster the user experience within the game or application.

SUMMARY

Described herein is a system and method for correlating a voice to user in a multi-user application. The system includes an image camera component capable of providing a depth image of one or more users in a field of view of the image camera component. The system further includes a microphone array capable of receiving audio within range of the microphone array. The microphone array is further capable of localizing a source of a voice to within a first tolerance. Embodiments further include a computing environment in communication with both the image capture component and microphone array and capable of distinguishing between different users in the field of view to a second tolerance. In embodiments, the first and second tolerances may at times prevent correlation of a voice to a user after an initial sampling of data from the image camera and data from the microphone array. However, the computing environment further performs additional samplings of data from the image camera and data from the microphone array. These additional samplings allow the correlation of the voice with the user or the additional samplings reducing a likelihood that the voice is correlated to the user.

BRIEF DESCRIPTION OF THE DRAWINGS

FIG. 6 depicts a flow diagram for identifying voices picked up by a microphone array of the present system.

FIG. 7 depicts a flow diagram of an embodiment for unambiguously correlating a voice to a body.

DETAILED DESCRIPTION

Embodiments of the present technology will now be described with reference to FIGS. 1A through 8B which in general relate to a system for tracking image and audio data over time to automatically identify a person based on a correlation of their voice with their body in a multi-user game or multimedia setting. In general, the system includes a capture device including one or more cameras for sensing objects such as people in a field of view, and a microphone array for sensing audio such as peoples' voices. The cameras are able to determine whether objects in the field of view are people, and can also determine physical characteristics of discerned people, such as for example skeletal joint location. The camera is also able to determine relative positions of the people in the field of view to each other and the capture device. The microphone array is able to determine whether sounds heard are voices, and can at times distinguish between different voices. The microphones may also be able to determine a relative position of a detected voice in relation to other detected voices and in relation to the microphones.

Where the image and audio systems are able to unambiguously determine that a given voice belongs to a given user body in the field of view, that voice-body correlation is stored. However, it may happen that the system is not able to establish a single unambiguous correlation after an image and audio sampling. Instead, the system identifies one or more candidate users to whom a sampled voice may belong. In this instance, the present system may employ a variety of factors to determine whether a voice is associated with a body above a predetermined threshold confidence level ("TCL"). If so, although not unambiguous, that voice-body association may be returned and stored for use in future samplings. The future samplings will either reinforce the association, or show that the association remains ambiguous, in which case the association may be removed.

Figure 1A:
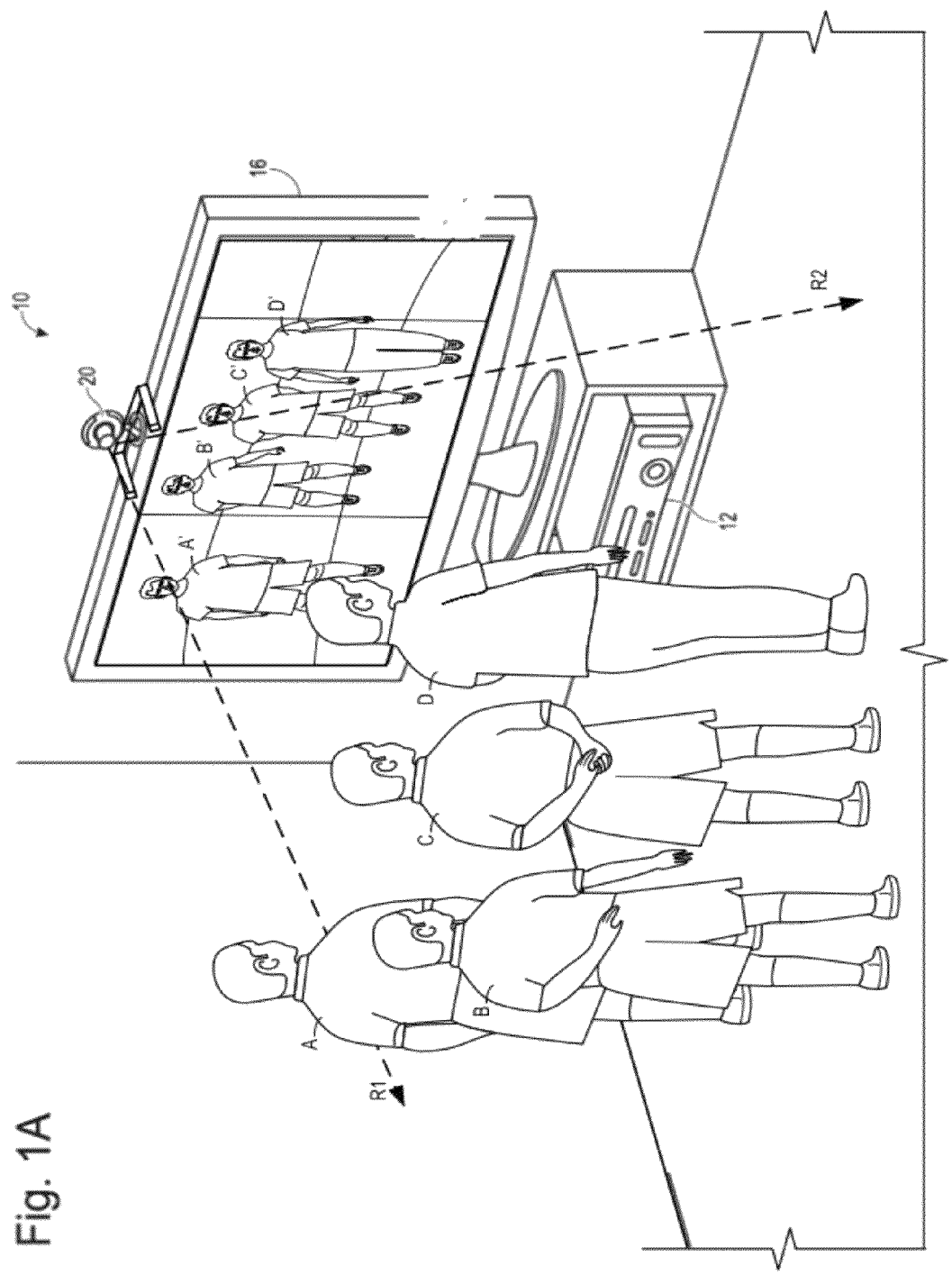
FIGS. 1A-1B illustrate an example embodiment of a target recognition, analysis and tracking system with a user playing a game.
Figure 1B:
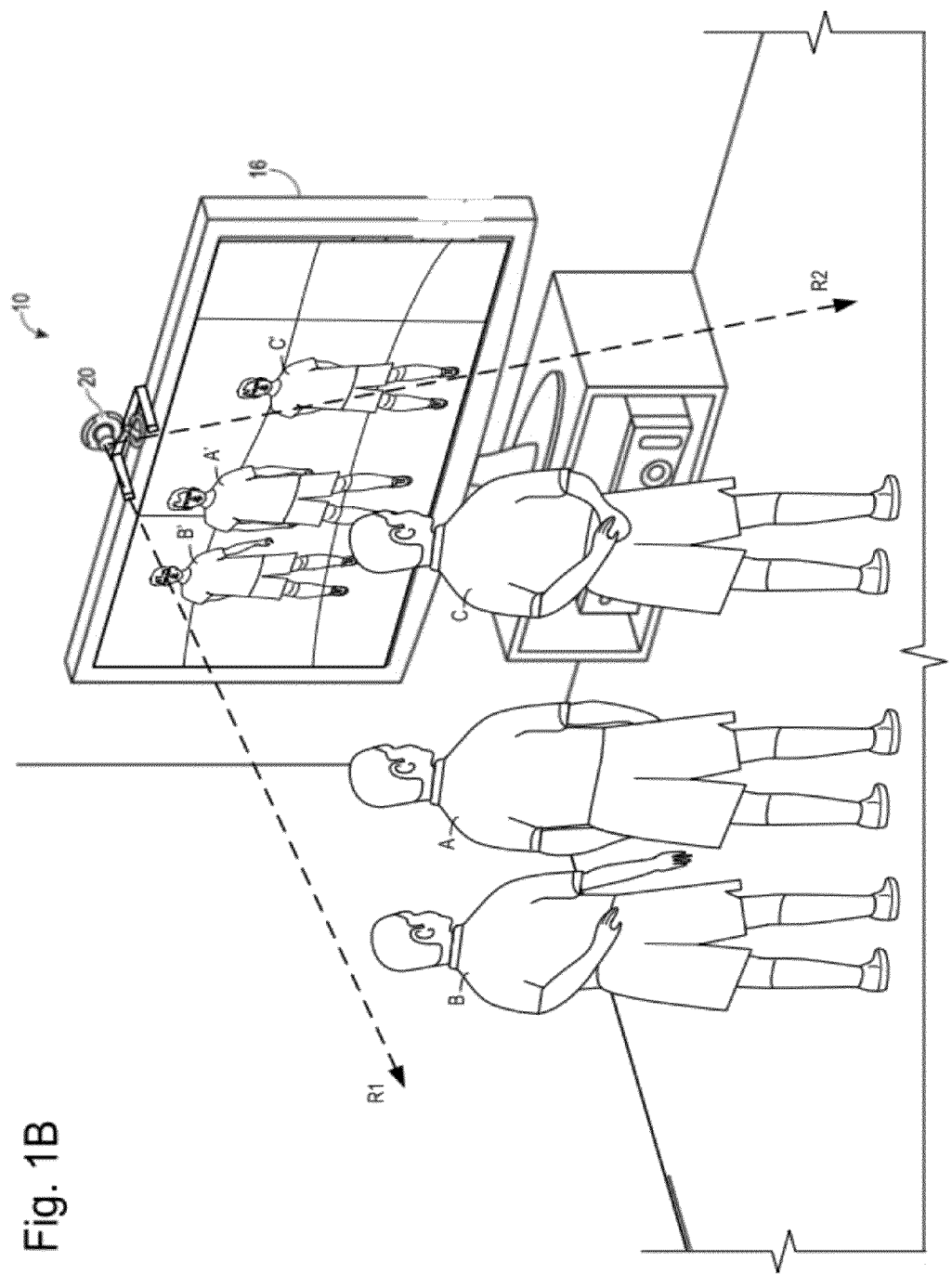
Figure 2:
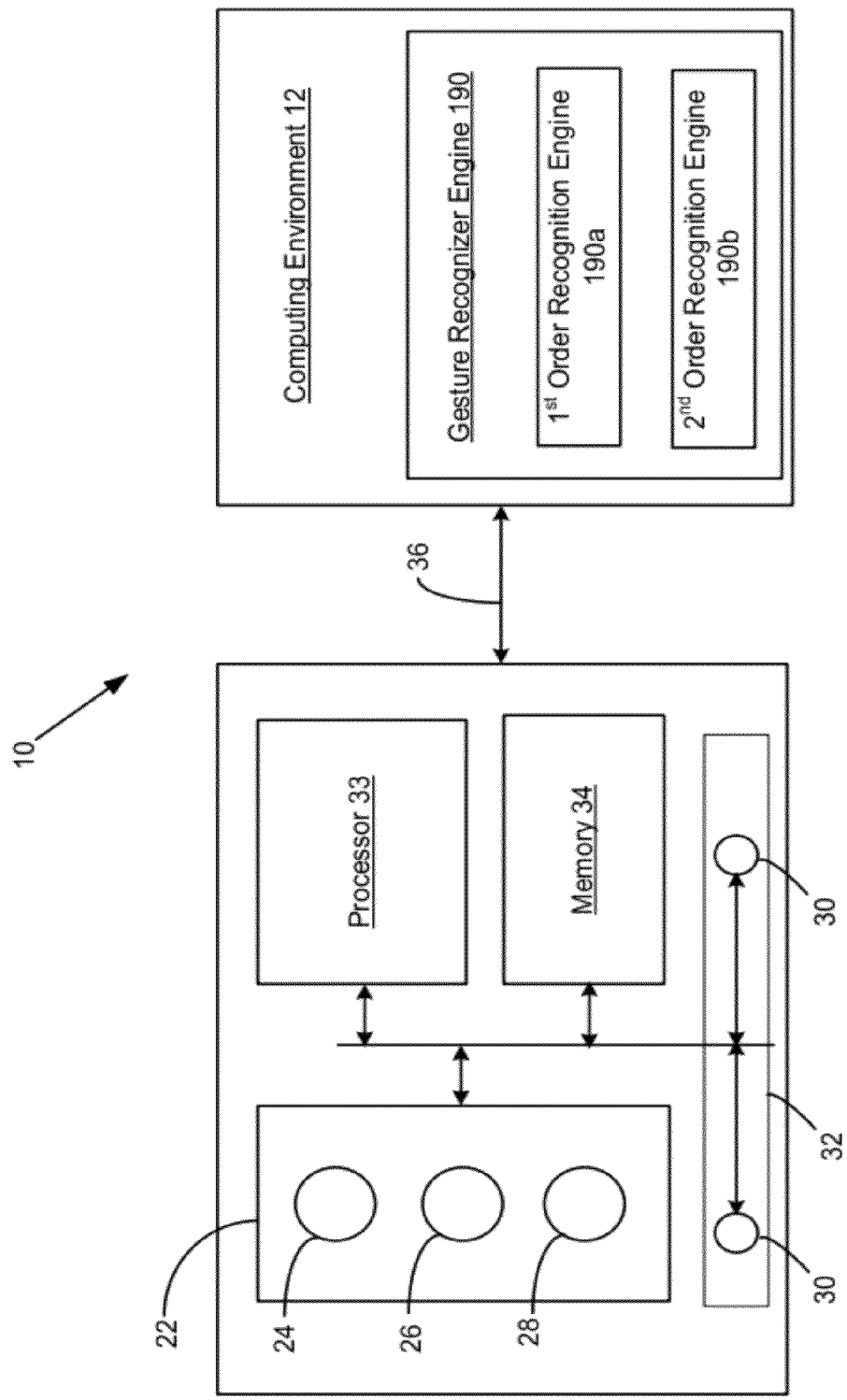
FIG. 2 illustrates an example embodiment of a capture device that may be used in a target recognition, analysis and tracking system.

Referring initially to FIGS. 1A-2, the hardware for implementing the present technology includes a target recognition, analysis, and tracking system 10 which may be used to recognize, analyze, and/or track one or more human targets such as the users A through D. Embodiments of the target recognition, analysis, and tracking system 10 include a computing environment 12 for executing a gaming or other application, and an audiovisual device 16 for providing audio and visual representations from the gaming or other application. The system 10 further includes a capture device 20 including one or more depth perception cameras and a microphone array including two or more microphones. The capture device 20 communicates with the computing environment 12 so that the computing environment 12 may control the output to audiovisual device 16 based in part on the information received from capture device 20. Each of these components is explained in greater detail below.

As shown in FIGS. 1A and 1B, in an example embodiment, the application executing on the computing environment 12 may be a multiplayer game. Based on information received from capture device 20, the computing environment 12 may use the audiovisual device 16 to provide visual representations of each user A-D as player avatars A'-D'. Users may move into and out of the field of view. For example, FIG. 1A shows users A-D, and FIG. 1B shows users A-C. Each of the avatars A'-D' may move on screen in a manner that mirrors the movements of the respective users A-D. Thus, the users have moved around in FIG. 1B relative to their positions in FIG. 1A, and user D's avatar is not visible in FIG. 1B as user D has left the field of view.

Although not critical to the present technology, the users A-D may perform gestures which are recognized by a software engine running on computing environment 12, so that a user's avatar performs some action upon recognition of a gesture by that user. While four users are shown in the example of FIGS. 1A and 1B, it is understood that the present technology may operate with more or less that four users in embodiments. Moreover, the present technology is not limited to correlating a voice with the speaker in the gaming context, but rather it may be used in a wide variety of other instances where it is desirable to identify a person based on a correlation of their voice with their body.

FIG. 2 illustrates an example embodiment of the capture device 20 that may be used in the target recognition, analysis, and tracking system 10. In an example embodiment, the capture device 20 may include an image camera component 22. The component 22 is configured to capture three-dimensional video images in the field of view via any suitable technique including, for example, time-of-flight, structured light, stereo image, or the like. According to one embodiment, the image camera component 22 may organize the calculated depth information into "Z layers," or layers that may be perpendicular to a Z axis extending from the depth camera along its line of sight.

Additional details relating to cameras which may form part of capture device 20 are set forth in copending patent application Ser. No. 12/474,655 filed on May 29, 2009, entitled "GESTURE TOOL," and copending patent application Ser. No. 12/391,150 filed on Feb. 23, 2009, entitled "STANDARD GESTURES," each of which applications is incorporated herein by reference in its entirety. However, in general, as shown in FIG. 2, the image camera component 22 may capture a depth image having a two-dimensional (2-D) pixel area of the captured scene where each pixel in the 2-D pixel area may represent a length in, for example, centimeters, millimeters, or the like of an object in the captured scene from the camera. The image camera component 22 is able to image objects within a field of view, represented by rays R1 and R2 in FIGS. 1A and 1B.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

According to another embodiment, the capture device 20 may include two or more physically separated cameras that may view a scene from different angles, to obtain visual stereo data that may be resolved to generate depth information. In either embodiment, the image camera component 22 is able to determine the orientation of the people within the field of view relative to each other, and is able to calculate the angle of each person in the field of view relative to the capture device 20.

The capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. For example, the capture device 20 may capture depth information of a capture area that may include a human target. The depth image may then be analyzed to determine whether the depth image includes a human target and/or non-human targets. Portions of the depth image may be flood filled and compared to a pattern to determine whether the target may be a human target. If one or more of the targets in the depth image includes a human target, the human target may be scanned.

Skeletal mapping techniques may then be used to determine various spots on that user's skeleton, joints of the hands, wrists, elbows, knees, nose, ankles, shoulders, and where the pelvis meets the spine. Other techniques include transforming the image into a body model representation of the person and transforming the image into a mesh model representation of the person. The skeletal model may then be provided to the computing environment 12 such that the computing environment may track the skeletal model and render an avatar associated with the skeletal model.

The capture device 20 may further include a microphone array 32 including two more microphones 30. The array of microphones perform at least two functions. The microphones 30 receive audio signals that may also be provided by one or more of users A-D to control their avatars A'-D', affect other game or system metrics, or control other applications that may be executed by the computing environment 12. A second function of the microphone array 32 is to facilitate identification of users as explained below.

In the embodiment shown, there are two microphones 30, but it is understood that the microphone array may have more than two microphones in further embodiments. The microphones may be aligned in a common vertical plane (i.e., at the same height) for embodiments where it may not be critical to resolve relative position along a vertical axis. However, it is further understood that the present technology may employ two to four or more cameras lying along different vertical lines and horizontal lines. In such embodiments, the microphone array would be able to employ acoustic localization techniques along both vertical and horizontal planes to pinpoint the location of one or more voices in three-dimensional space.

The microphones 30 in the array may be positioned near to each other as shown in the figures, such as for example one foot apart. It is understood that in further embodiments, the microphones may be spaced closer together, or farther apart, for example at corners of a wall to which the capture device 20 is adjacent.

The microphones 30 in the array may be synchronized with each other, and each may include a transducer or sensor that may receive and convert sound into an electrical signal. Techniques are known for differentiating sounds picked up by the microphones to determine whether one or more of the sounds is a human voice. Microphones 30 may include various known filters, such as a high pass filter, to attenuate low frequency noise which may be detected by the microphones 30.

Within given tolerances, the array 32 is also able to determine the orientation of the perceived voices relative to each other, and is able to calculate the angle of each voice source relative to the microphone array using acoustic localization techniques. Various acoustic localization techniques are known. One embodiment may employ a time difference of arrivals (TDOA) technique having a first step of determining a set of TDOAs among different microphone pairs. That is, for each of a set of microphone pairs, the relative time difference between the arrival of the acoustic source signal at each of the microphones in the pair is determined. For example, the TDOA for two microphones i and j measuring the location, s, of an acoustic source may be determined by:

$$TDOA_{i,j} = (|s - m_i| - |s - m_j|)/c$$

where $m_i$ is the position of the $i^{th}$ microphone, $m_j$ is the position of the $j^{th}$ microphone and c is the speed of light.

TDOA techniques further include a second step of using the determined TDOA data and the microphone array geometry to estimate the location of the acoustic source. This second step may be performed by a variety of known methods including for example the maximum likelihood method, the triangulation method, the spherical intersection method, and the spherical interpolation method.

The TDOA method is one of a number of known methods which may be employed to locate the source of a perceived voice. Others include steered beamformer-based techniques and high-resolution spectral estimation-based techniques. Further details relating to microphone systems for acoustic localization may be found for example in U.S. Pat. No. 6,826,284, entitled "Method and Apparatus for Passive Acoustic Source Localization for Video Camera Steering Applications," and in a published paper by H. Wang and P. Chu, "Voice Source Localization for Automatic Camera Pointing System In Videoconferencing," in Proc. IEEE Int. Conf. Acoustics, Speech, and Signal Processing (ICASSP), Munich, Germany, April 1997, pp. 187-190. The above patent and paper are hereby incorporated by reference herein in their entirety. Where a technique allows acoustic source localization to a given tolerance using a single microphone, microphone array 32 may include one or more microphones.

In an example embodiment, the capture device 20 may further include a processor 33 that may be in operative communication with the image camera component 22 and microphone array 32. The processor 33 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction. The processor 33 may also perform the above described operations relating to acoustic localization.

The capture device 20 may further include a memory component 34 that may store the instructions that may be executed by the processor 33, images or frames of images captured by the 3-D camera or RGB camera, audio data from microphones 30 or any other suitable information or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22, microphone array 32 and the processor 33. According to another embodiment, the memory component 34 may be integrated into the processor 33, the image capture component 22 and/or microphone array 32.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36. Image and audio data from capture device 20 may also be communicated to the computing environment 12 via the communication link 36.

Figure 3A:
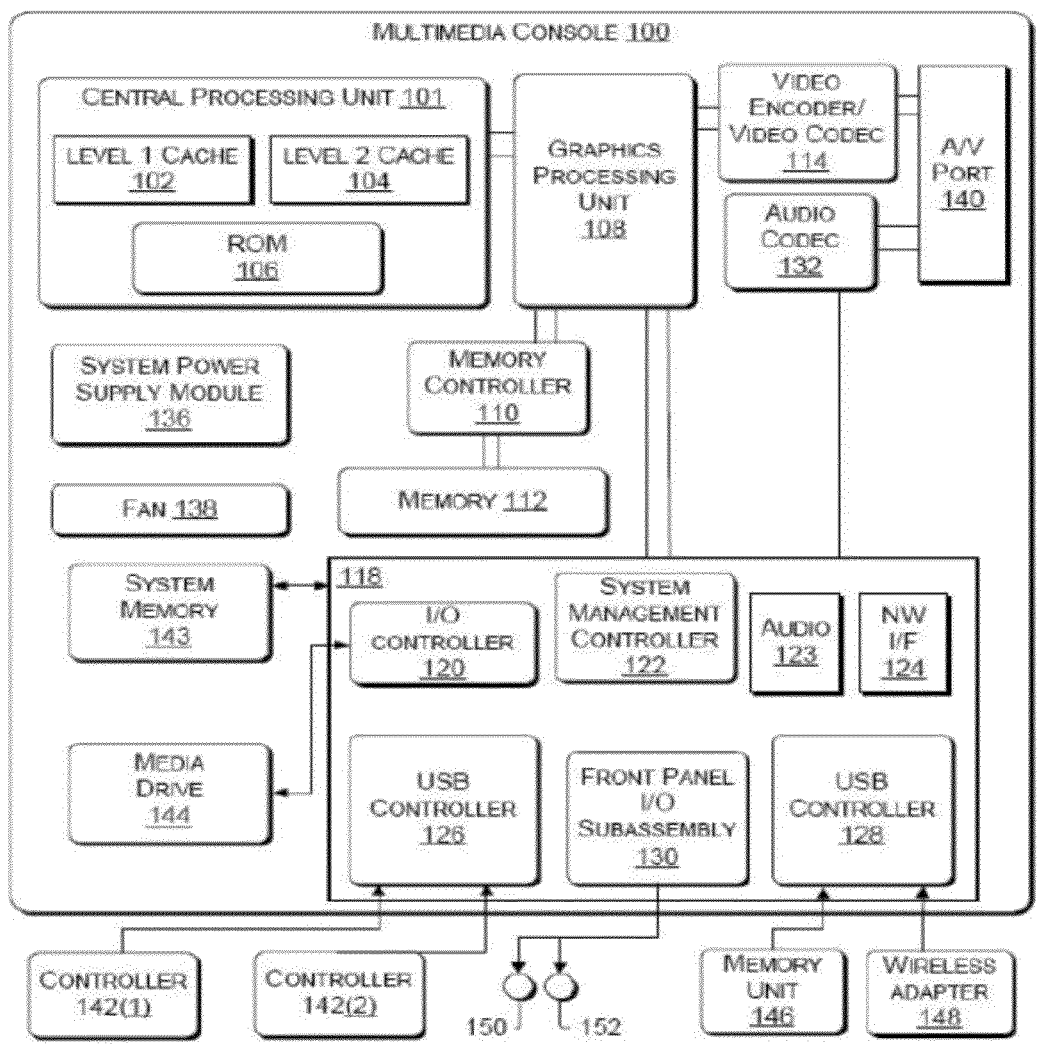
FIG. 3A illustrates an example embodiment of a computing environment that may be used to interpret one or more gestures in a target recognition, analysis and tracking system.

FIG. 3A illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3A, the multimedia console 100 has a central processing unit (CPU) 101 having a level 1 cache 102, a level 2 cache 104, and a flash ROM 106. The level 1 cache 102 and level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming applications such that each will have a focus of the device. The application manager preferably controls the switching of the input stream, without knowledge of the gaming application's knowledge and a driver maintains state information regarding focus switches. The cameras 26, 28 and capture device 20 may define additional input devices for the console 100.

Figure 3B:
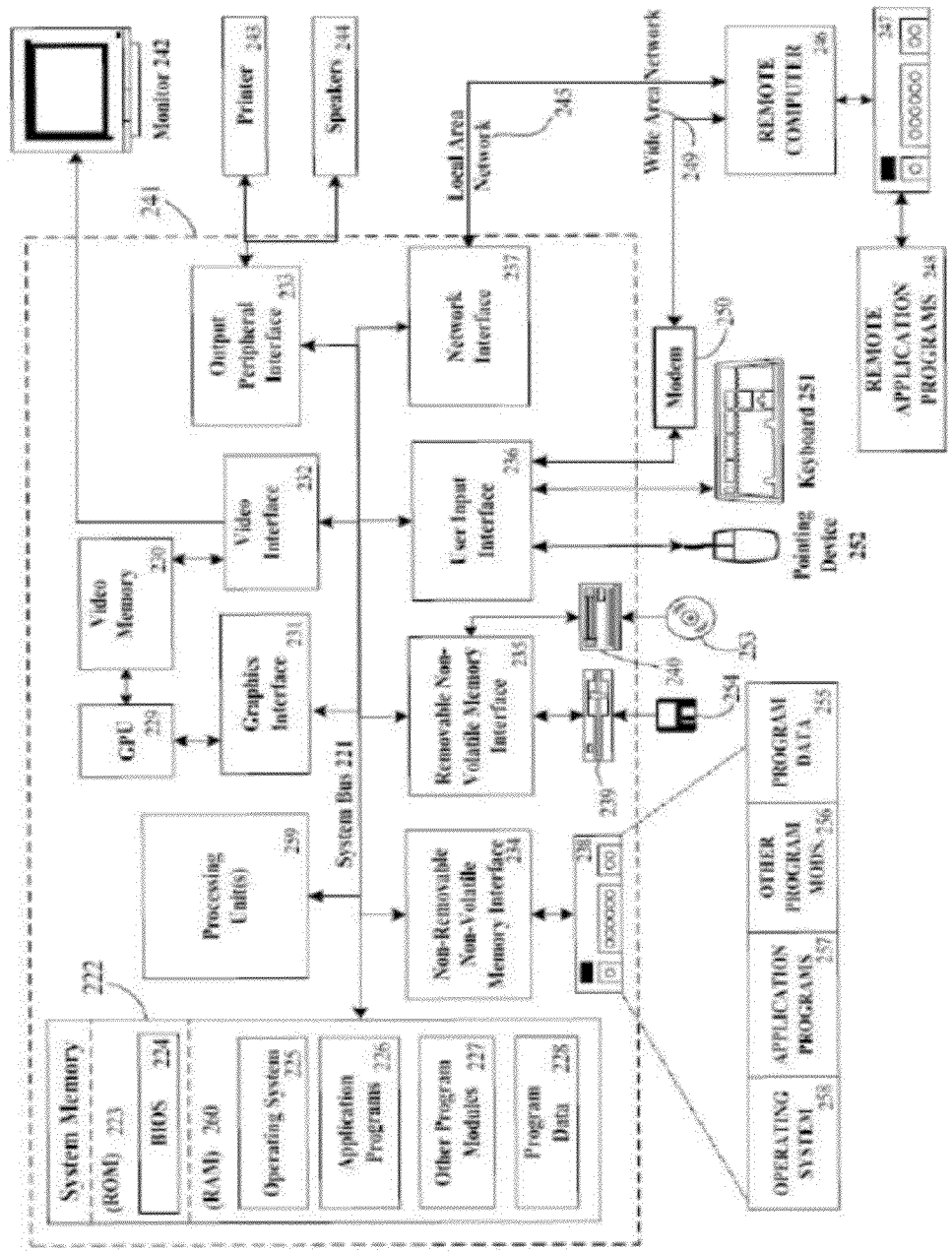
FIG. 3B illustrates another example embodiment of a computing environment that may be used to interpret one or more gestures in a target recognition, analysis and tracking system.

FIG. 3B illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 3B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 3B illustrates operating system 225, application programs 226, other program modules 227, and program data 228.

The computer 241 may also include other removable/non-removable, volatile/nonvolatile computer storage media. By way of example only, FIG. 3B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 3B, provide storage of computer readable instructions, data structures, program modules and other data for the computer 241. In FIG. 3B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 3B. The logical connections depicted in FIG. 3B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 3B illustrates remote application programs 248 as residing on memory device 247. It will be appreciated that the network connections shown are exemplary and other means of establishing a communications link between the computers may be used.

Figure 4:
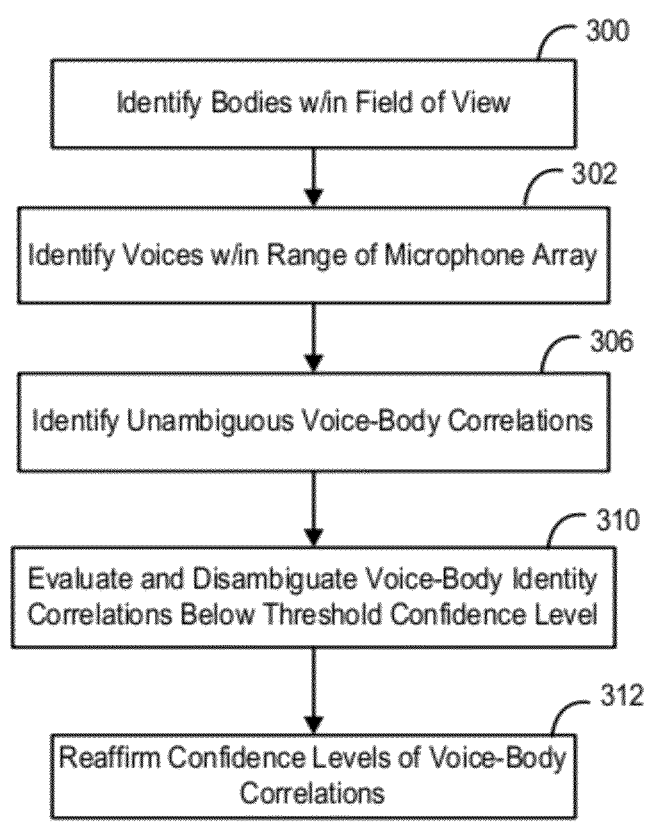
FIG. 4 depicts a high level flow diagram of an example method for correlating a voice to a body.

Methods for identifying users based on a correlation between perceived image data relating to a user and perceived voice data will now be described with reference to the flowcharts of FIGS. 4-8B. FIG. 4 is a high level flowchart of the overall operation of the present technology. It is understood that the operation of the present technology may be carried out by the processor 33 within capture device 20, the processor 101, 259 within computing environment 12, or a combination of the two acting together. In step 300, the present system identifies, or enrolls, bodies within the field of view of the image camera component 22 (such as for example one or more of users A-D). This operation is performed on a frame-by-frame basis, but information from previous frames, such as background information, may be cached to speed processing. Further details regarding body enrollment of step 300 are explained below with reference to the flowchart of FIG. 5.

In step 302, the present system enrolls voices detected within range of the microphone array 32. There will be instances where the present system is able to unambiguously associate a voice with a particular body. For example, the microphone array 32 may be able to localize the source of a voice to a tolerance including a particular angle or range of angles with respect to the image capture device 20, and the image camera component 22 determines that there is only one user at that angle or range of angles. In such an instance, the present system is able to unambiguously correlate the detected person with the detected voice. Further details relating to steps 302 and 306 are set forth below with respect to the flowchart of FIG. 6.

On the other hand, it may happen that the system is not able to establish a single unambiguous correlation after an image and audio sampling, but rather identifies one or more candidate users to whom the voice may possibly belong. For example, there may be two users having a physical appearance that is too close to distinguish between using image recognition techniques of the present system. Alternatively or additionally, the microphone array may only be able to determine that a voice comes from an area in the field of view having more than one person. This may be true for example where consumer-grade hardware is used to capture the image and audio data.

In this instance, the present system may employ a variety of factors to build a confidence level score indicative of a confidence level with which the voice is associated with a given user. Even though not unambiguous, the factors may result in a score above a threshold confidence level. If so, that voice-body association above the threshold confidence level is stored for use in future samplings. The future samplings may reinforce the association, for example where the future samplings eliminate other users to whom the voice may belong to. Alternatively, the future samples may show that the association remains ambiguous, in which case the association may be removed.

Even after a voice is correlated to a body, embodiments of the present technology may repeatedly re-evaluate and reaffirm confidence levels of the voice-body correlations (step 312). The processes of evaluating, disambiguating and reaffirming confidence levels is described hereinafter with respect to the flowcharts of FIGS. 8A-8B.

Figure 5:
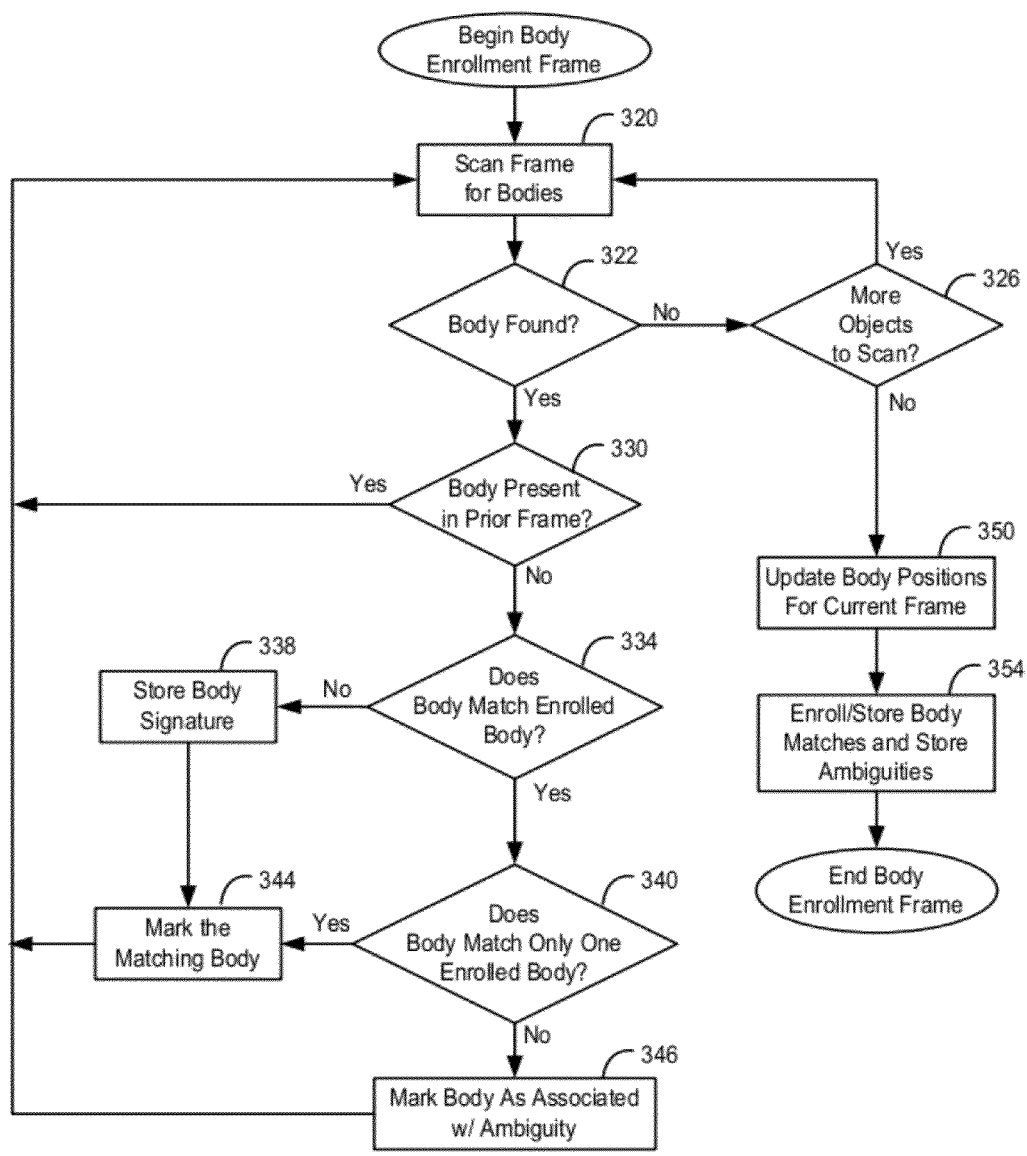
FIG. 5 depicts a flow diagram for identifying one or more bodies within a field of view.

The flowchart of FIG. 5 shows steps for enrolling users based on obtaining image data which may allow the system to distinguish users from other users. The present system may use a variety of criteria for enrolling users, including analysis of a plurality of skeletal reference points of the different users. Once a user is identified, that information may be stored for example within memory 34, and/or within memory in the computing environment 12. However, it may happen that two or more users have physical appearances that are close enough to each other that the system is not able to distinguish between them using image data alone. As explained hereinafter, such users may be disambiguated using samplings of image and voice data over a period of time.

Accordingly, in step 320, the present system scans a video frame for human users within the field of view, such as for example one or more users A-D. As indicated above, current technologies allow for human bodies to be discerned from other objects which may be within the field of view. In step 322, the present system determines whether a body has been found within the field of view. If not, the system looks as to whether there are more objects to scan in the field of view in step 326. Assuming there are, the system returns to step 320 to scan for more bodies. On the other hand, if a body is found in step 322, the present system checks in step 330 whether that body was present in a prior frame. The system may look at a variety of factors in making this determination, including a match of skeletal reference points or other physical characteristics between a body in a current frame and previous frame, and whether the position of the body in the current frame could have moved there from the position detected in the prior frame given the frame rate. Once it is determined that a found body was present in a prior frame in step 330, the system returns to step 320 to scan for more bodies.

On the other hand, if step 330 determines that a found body was not found in a prior frame, the system checks in step 334 whether the found body matches a body that has already been enrolled. In particular, the system compares the information describing a body in the current frame with information from memory regarding bodies that have previously been identified and enrolled. If the body from the current frame was not previously enrolled, the system stores the body signature (i.e., skeletal features and/or other physical characteristics) in memory in step 338. After storing the body signature, the system marks the matching body as being identified in step 344, and then returns to step 320 to scan for more bodies.

On the other hand, if it is determined in step 334 that the found body does match a known body, the system checks in step 340 whether the found body matches only one known body. In particular, the found body may have skeletal features which are sufficiently close to the skeletal features of previously identified and stored bodies. If the system determines in step 340 that the found body matches only one known body, the found body is marked as matching the known body in step 344 and the system returns to step 320 to scan for more bodies. Alternatively, if it is determined in step 340 that the found body matches more than one known body, the found body is marked as associated with an ambiguity in step 346, and the system returns to step 320 to scan the frame for more bodies.

After the system has determined that there are no further objects to scan in the frame in step 326, the system updates the body positions for the current frame in step 350 and enrolls and stores all body matches in step 354. Step 354 also stores ambiguities in body identity which were found.

As indicated above, acoustic technologies are able to filter out and discern human voices from the variety of sounds and background noises which may be picked up by the microphone array. Concurrently with searching for and enrolling bodies as described above with respect to the flowchart of FIG. 5, the system also searches and enrolls voices as will now be described with respect to FIG. 6. In order to enroll a voice, the system collects phonetically rich data containing a variety of phonemes sufficient to identify a voice as distinguished from other voices.

The process of enrolling voices begins with a step 360 of determining whether a discerned voice can be correlated with a visible body. Step 360 is described in greater detail below with reference to the flowchart of FIG. 7. In step 362, the system estimates the source location of a voice to enroll. As described above, any of various acoustic source localization techniques may be used for this purpose. Embodiments may employ an acoustic localization technique in a low cost, consumer-oriented system which returns a source location plus or minus some tolerance level. In step 363, the system determines whether the voice must necessarily come from a source within the field of view of the image camera component 22, i.e., between rays A and B shown in FIGS. 1A and 1B. If not, the system determines that the voice is not correlated with a visible body in step 364.

On the other hand, if the voice does come within the field of view, the system determines in step 366 whether there is a body at the estimated source of the voice. If not, the system determines that the voice is not correlated with a visible body in step 364. On the other hand, if there is a body detected at the estimated source of the voice, the system next checks in step 368 whether there is more than one body within the range of possible sources of the voice. If there are, the system cannot correlate the voice with a visible body in step 364. On the other hand, if the system passes all the checks in steps 363, 366 and 368, the system is able to unambiguously correlate a voice with one visible body in step 370.

Returning to the flowchart of FIG. 6, if the system is unable to correlate a voice with a visible body in step 360, the utterance is not eligible for enrollment in step 372, and in embodiments, the system would not use the utterance for enrollment and it would not associate it with a particular person. In embodiments, the utterance may still be used by the system for speech recognition of a verbal instruction or command.

In embodiments, where an utterance is not eligible for enrollment in step 372, the present system may prompt one or more users in the field of view to speak and perform some physical act in step 373. The physical act may for example be to stand in the field of view but apart from other users. In this way, in addition to receiving voice data, the system is able to positively identify and enroll the speaker as the one performing the requested act. These physical acts may be part of the game or application metric or outside of the game or application metric. Step 373 may be omitted in further embodiments. Where omitted, the user will experience less intrusion due to enrollment, but completion of enrollment may be subject to the chance actions of users.

On the other hand, if it is determined in step 360 that the voice is correlated with a visible body, the system next checks in step 374 whether the identified visible body is continuous from the previous enrollment utterance. In other words, if the system correlates the voice with a visible body in step 360, the system checks in step 374 whether that body from the previous frame could have moved continuously to the position of the body identified in step 360 in the current frame. If it is determined in step 374 that the body with which the voice was associated in the previous frame could not be the body with which the voice is associated in the current frame, the system treats the prior correlation as being incorrect. In such an event, the system begins a new enrollment process for the voice in step 376 with the body identified in step 360. In step 378 the utterance is then added to the enrollment.

In step 380, the system checks whether enrollment is complete. That is, the system checks whether sufficient phonetic data has been collected to allow the system to unambiguously identify a given voice as distinguished from other voices. If not, the utterance is not sufficient for enrollment, but in embodiments, it may be stored in step 381 for use together with future utterances to establish enrollment once the necessary diversity of phonetic data has been collected. If on the other hand, the system determines that enrollment is complete in step 380, the system saves the enrolled voice in step 382 and associates and stores the enrolled voice with a known body in step 384. The system then returns the known voice correlated to the known body.

In embodiments, where enrollment is not complete in step 380, the present system may prompt one or more users in the field of view to speak in step 383. This action by the system may be masked as part of the game or application metric, or it may be outside of the game or application metric. Where step 383 is performed, it may prompt a particular enrolled user to speak certain phonetically rich words and/or sounds so that, once spoken, the system is able to enroll the user's voice with the user's known body for later utterances. Step 383 may be omitted, in which case a failure to enroll in step 380 may result in the return of an unknown voice as described above.

The operation of the present technology as described above with respect to FIG. 6 enrolls and stores a new voice, and further determines whether that voice may unambiguously be associated with a known body. As described above, it may often be the case that the system hears a voice but is not able to unambiguously correlate that voice with a single body. Accordingly, the present technology includes the steps of evaluating, disambiguating, and reaffirming voice-body correlations. A more detailed description of this process will now be described with respect to the flowcharts of FIGS. 8A and 8B.

Figure 8A:
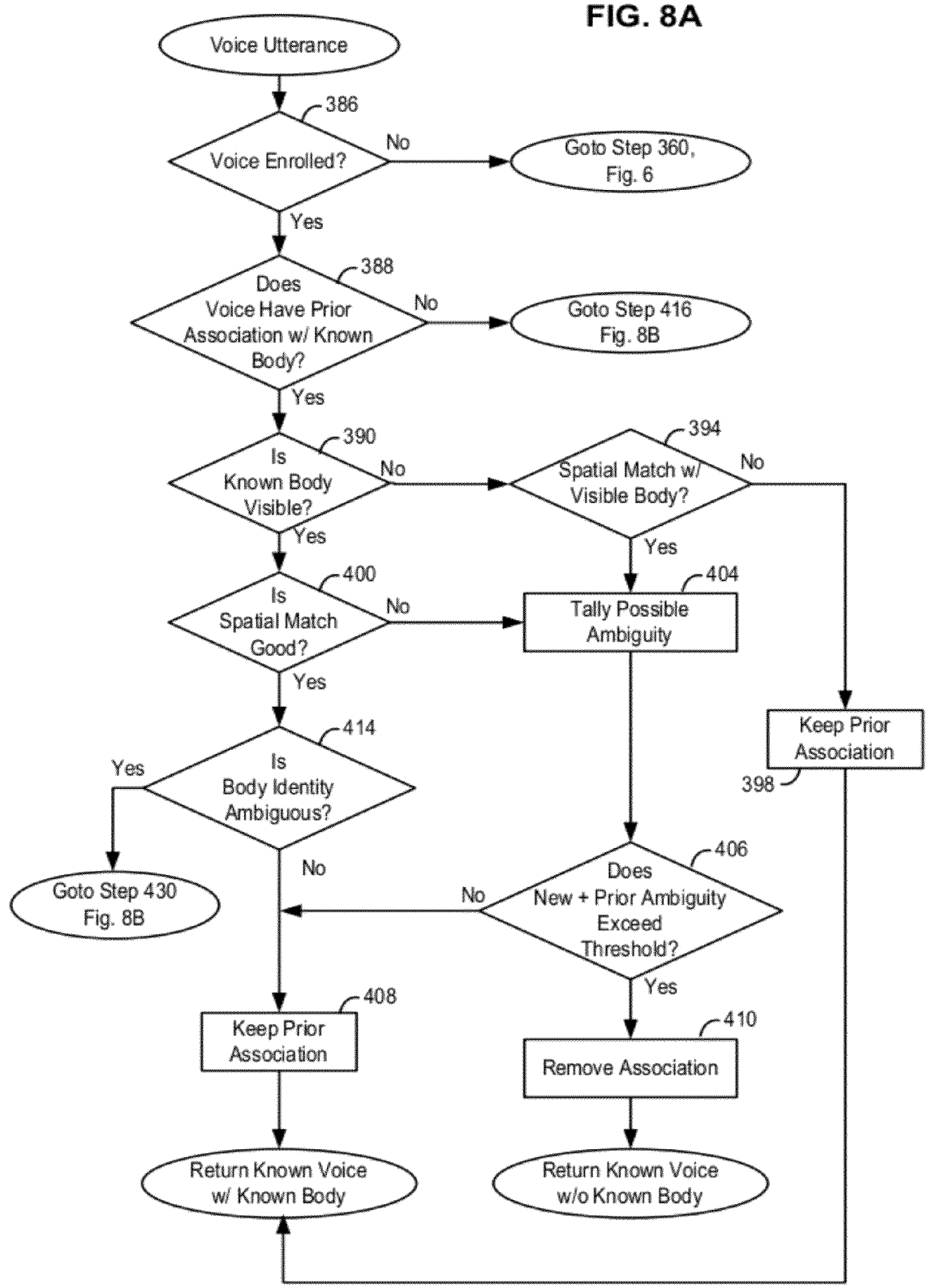
FIGS. 8A and 8B together depict a flow diagram of an embodiment for correlating a voice to a body via multiple samplings of voice and body location identification.
Figure 8B:
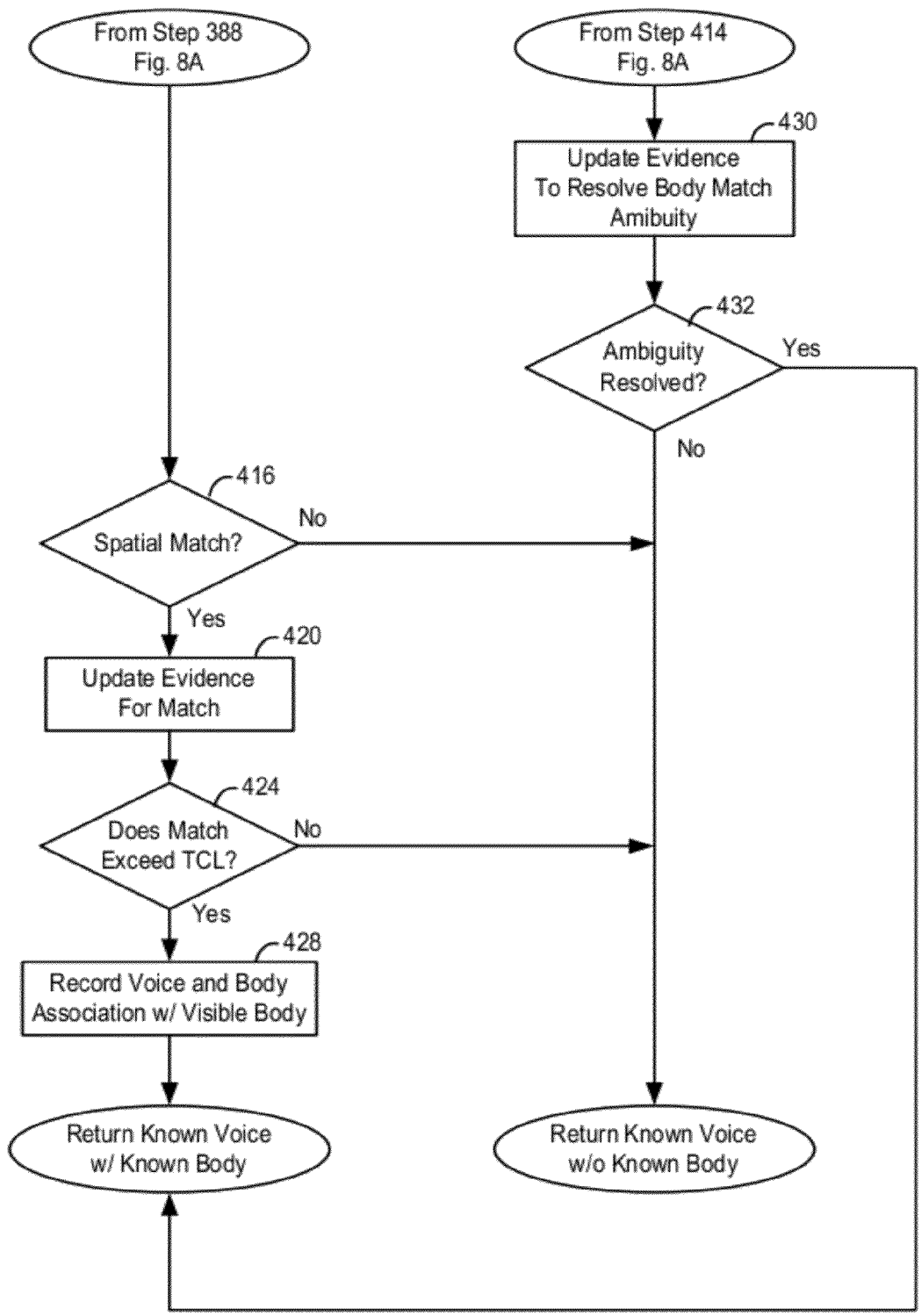

In general, the microphone array 32 listens for uttered voices, and upon detecting a voice utterance, it performs the steps 386-432 described below with respect to FIGS. 8A and 8B. It is possible that more than one voice may be detected within the same period of time. The present system may perform the steps of FIGS. 8A and 8B on each uttered voice the microphone array 32 is able to perceive separately and distinctly. The system may run through the steps of FIGS. 8A and 8B once per frame, or once per a predetermined number of frames, to continuously evaluate, disambiguate and reaffirm voice-body correlations over time.

In step 386, the system checks whether an utterance is a voice that is enrolled. If not, the system goes to step 360 as described above with respect to FIG. 6 to attempt to enroll the voice and to see if it may be unambiguously associated with a body within the field of view.

In step 386, if it is determined that the voice is enrolled, the system checks in step 388 whether the voice has a prior match with a known body. If not, the system determines whether there is a spatial match between the voice and a body within the field of view as described hereinafter with respect to step 416 in FIG. 8B. However, if step 388 determines that there is a prior match of the voice to a known body, the system checks in step 390 whether the known body is visible within the field of view. If not, the present system checks in step 394 whether there is a spatial match between the uttered voice and a body that is visible within the field of view. The system performs step 394 to check whether the voice-body association retrieved in step 388 is correct. In particular, if there is a match between the voice and a visible body in step 394, but it is determined that the previously identified body is not visible in step 390, then the system determines that the prior voice-body correlation may not be correct, and that an ambiguity may exist. The system notes this ambiguity and proceeds to step 404 described hereinafter. Step 394 may for example be performed as described above in FIG. 7 by determining the approximate source of the voice and seeing whether there is a body at that approximate source.

If it is determined in step 390 that the body previously matched to the voice is not visible and step 394 confirms no match of the voice to a body that is then visible, the prior association in step 398 is maintained and the system returns a known voice with a known body. On the other hand, if step 390 determines that the body previously matched to the voice is visible, the system next checks in step 400 whether the spatial match between the voice and the known body is a good match, i.e., the spatial match is unambiguous. Step 400 may for example be performed as described above in FIG. 7.

The present system keeps track of whether a given voice-body association remains ambiguous in a number of different samplings. If, after examining a voice-body association in a number of different samplings, the system cannot unambiguously determine that the voice is in fact associated with that body by the process of elimination, the system may treat the association as being too ambiguous to maintain, and it removes that association. Accordingly, in step 404, the present system tallies how many times a given voice-body association was found to be ambiguous. In step 406, the system determines whether the tally in step 404 exceeds some ambiguity threshold. If so, the previously identified association is removed in step 410, and the system returns a known voice but not associated with a known body. If the tally in step 406 does not exceed the ambiguity threshold, the system maintains the association in step 408 and returns a known voice-body association. In embodiments, the ambiguity threshold may for example be between 3 and 6. Thus, if the threshold is set at 5 for example, if the system cannot rule out an ambiguity of an association between a given voice and a body after 5 samplings, the system would remove that association. The ambiguity threshold may be lower than 3 and higher than 6 in further embodiments.

Described above is what the system does if a spatial match in step 400 is ambiguous. However, if it is determined in step 400 that the spatial match is unambiguous, the system next determines in step 414 whether the body matched to the voice was previously considered ambiguous. If so, the system updates the association to remove the ambiguity as explained below with reference to step 430 in FIG. 8B. On the other hand, if it is determined in step 414 that the stored voice-body association was not ambiguous, the system keeps the association in step 408, and the system returns a known voice with a known body.

As described above, step 390 and those following are performed if it is determined in step 388 that a voice has a prior association with a known body. However, if it is determined in step 388 that the enrolled voice does not have a prior match with a known body, the present system performs step 416 in FIG. 8B. Step 416 attempts to determine whether an association exists between the voice and one or more users within the field of view. It may happen that step 416 is able to unambiguously identify a single user to whom the voice must belong. For example, the system may determine that the voice comes from within the field of view and there is only a single person in the field of view, as described above with respect to FIG. 7.

Alternatively, although not unambiguous, the step 416 may identify one or more users which could possibly be associated with the voice. In order to make this determination, the present system may employ a variety of factors which can be applied to arrive at a scored confidence level. In general, if a voice can be associated to a body above a threshold confidence level upon consideration of the factors, that voice-body association is stored and returned. In embodiments, the factors which may contribute to a score may include one or more of the following.

One factor may be how close the estimated position of the voice source is to the known body. Where the body is at the exact location estimated by the acoustic localization technique, this factor would yield a higher score than an instance where the body was spaced from the estimated position of the voice. Another factor forming part of the score may be how many bodies are in the field of view. The more bodies there are, the less confidence there will be in the correlation of the voice to any one of those bodies. Conversely, if the only person in the field of view is the person with whom the voice was previously associated, this would result in a score tending to indicate a good spatial match between the correlated voice and body.

Another factor contributing to the score is the number of voices which are being heard. This factor may detract from or add to the score. For example, if there are many voices such that there is too much noise to accurately determine the source of the voice being considered, this would tend to lower the score of the association of that voice to the identified body. On the other hand, if the voices heard in addition to the voice under consideration have previously been associated with other users and those users are within the field of view, this factor may add to the score measuring the association between the voice under consideration and the previously identified body.

In addition to the number of people within the field of view, the closeness of the people to the estimated source of the voice is another factor affecting the score. If two or more people are near to the estimated source, this will tend to lower the score, whereas a situation where there are multiple people in the field of view, but only the previously matched person is near the estimated source, this will tend to bolster the score.

Another factor contributing to the score is whether the source of the voice is estimated to be centered within the field of view, as opposed to near the edges. When a voice is estimated to be near the edge of the field of view, the voice could be from the previously matched person within the field of view, or from a person outside of the field of view. Thus, a spatial match between a person and a voice estimated to be at the center of the field of view will result in a higher score than one at the edge of the field of view. Those of skill in the art will appreciate additional factors which may be used to arrive at a score indicative of whether there is a correlation between a voice and a body.

Different embodiments may use one or more of the above-described factors in reaching a scored confidence level. Other factors may be used in addition to or instead of one or more of the above-described factors. In embodiments, the factors that are used may be weighted and quantized so that, upon consideration of the factors used with respect to a particular voice-body pair, a numerical score may be obtained. A threshold confidence level may be arbitrarily selected above which the score is said to be significant and enough to store an association between the voice with a body.

After an unambiguous identification or a scored confidence level is reached in step 416, the system updates evidence (scores) for any associations made in step 420. In step 424, the system checks whether a match was found that was either unambiguous or otherwise attained a score which exceeds the threshold confidence level. If not, the system returns that there are no known bodies were found to match the known voice. On the other hand, if it is determined in step 424 that one or more bodies were found to match the voice above the threshold confidence level, those associations are recorded in step 428, and the system returns that the known voice was associated with at least one known body. As indicated, the steps of FIGS. 8A and 8B may then be repeated in multiple samplings so that an association may become unambiguous through a process of elimination as to which bodies a voice can belong to, or an association may be removed if it remains ambiguous after multiple samplings.

As described above with respect to FIG. 8A, step 408 is performed following step 414 if it is determined in step 414 that a stored body identity is not ambiguous. However, if it is determined in step 414 that a stored body identity is ambiguous, the present system performs step 430 as shown in FIG. 8B. In particular, in steps 388, 390 and 400, it is determined that the voice has an association with one or more known bodies, one of the known bodies is visible, and the spatial match with that known body is unambiguous. Step 414 then looks to memory to determine if there is more than one body associated with that voice in storage. If there is, the current sampling disambiguates that association in step 430 by updating the evidence to show the unambiguous correlation between the voice and body.

Even after the system has determined that a voice is unambiguously associated with a user, the present system allows for a possible error in that association. In particular, it may be possible that that same voice is unambiguously associated with another user in memory, or that user is unambiguously associated with another voice in memory. Thus, step 432 determines whether the ambiguity is resolved. If so, the system returns a known voice with a known body. If it is not, the system returns a known voice, but without an associated known body. The steps of FIGS. 8A and 8B may then be repeated in multiple samplings so that an association may become unambiguous once again through a process of elimination as to which bodies a voice can belong to, or an association may be removed if it remains ambiguous after multiple samplings.

Using the above-described system, voices may be correlated with bodies in a gaming, multimedia or other multi-user application. While systems may exist which are capable of unambiguously correlating a voice to a body in a single sampling, these systems require costly, precision systems which are not feasible in most gaming, multimedia or other consumer-based application. However, unlike conventional systems, the present system is able to make reliable voice-body correlations where the equipment used is unable to determine such correlations in a single sampling. Moreover, systems are known which start with enrolled users. That is, the set of users have known, enrolled body signatures and/or known, enrolled voices. Conventional systems do not make voice-body correlations starting with users having unknown body signatures and unknown voices. The present technology allows such correlations to be made.

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method of identifying a correlation between a user and user voice, the method comprising the steps of:
    (a) receiving images of one or more users taken over a plurality of time periods;
    (b) receiving audio of voices for a plurality of time periods; and
    (c) correlating a voice identified in said step (b) to a user of the one or more users based on a plurality of samplings of determined positions of the user in different images and determined source locations of the voice at different times, said step (c) comprising the step of performing a first sampling of the plurality of samplings to derive a scored confidence level of an association between the voice and a user, the scored confidence level obtained by examining one or more of the following factors:
        i. how close the estimated position of the voice source is to the one or more users;
        ii. the number of voices which are being heard;
        iii. the closeness of the one or more users to an estimated source of the voice;
        iv. whether the source of the voice is estimated to be centered within a field of view of the image or closer to edges of the field of view.

2. The method recited in claim 1, said step (c) comprising the step of a sampling of the plurality of samplings being formed by determining a location of the one or more users from examination of an image of the plurality of images and being formed by determining a location of the voice using an acoustic source localization technique.

3. The method recited in claim 1, said step (c) comprising the step of performing a first sampling of the plurality of samplings to obtain a confidence level in an association between the voice and the user, a confidence level above a predefined threshold resulting in the voice and the user being associated together in memory.

4. The method recited in claim 3, said step (c) comprising the step of the confidence level going up in subsequent samplings of the plurality of samplings if the subsequent samplings decrease the number of possible users to whom the voice can belong to.

5. The method recited in claim 4, further comprising the step of unambiguously correlating the voice to a user upon eliminating all other users to whom the voice could belong to in the plurality of samplings.

6. The method recited in claim 5, further comprising the step of performing additional samplings in the plurality of samplings after the correlation between the voice and user has been unambiguously associated together.

7. The method recited in claim 3, further comprising the step of removing the correlation if the additional samplings are unable to remove an ambiguity with respect to which user the voice belongs or if the additional samplings show the voice belongs to a second user of the one or more users.

8. The method recited in claim 1, said step (b) of receiving images of one or more users taken over a plurality of time periods comprising the step of measuring locations of at least portions of the users skeletal joints.

9. The method of claim 8, said step (c) of correlating a voice received in said step (b) to a user based in part on a determined source locations of the voice comprising the step of determining source locations of a voice by time difference of arrivals.

10. In a multi-user application where correlation of a voice to a user may require more than a single sampling of the voice and user location, a method of identifying a correlation between a user and user voice, the method comprising the steps of:
    (a) receiving a plurality of images including one or more users;
    (b) receiving audio for a plurality of time periods covering the plurality of images;
    (c) performing an initial sampling examining a location of one or more users and a location of a voice, the initial sampling determining the voice is ambiguously correlated to a user of the one or more users; and
    (d) performing subsequent samplings, the subsequent samplings removing ambiguity as to the correlation determined in said step (c) or confirming the ambiguity to remove the correlation determined in said step (c).

11. The method of claim 10, further comprising the step (d) of performing additional samplings examining locations of the one or more users and locations of the voice, the additional samplings confirming the correlation of the voice with the user or the additional samplings reducing a likelihood that the voice is correlated to the user.

12. The method of claim 11, wherein said steps (c) and (d) unambiguously correlate the voice to the user by identifying a correlation between a location of the user and a source of the voice and by eliminating all other users as possible sources of the voice.

13. The method of claim 10, wherein said step (c) further comprises the step of examining physical traits of the user to distinguish the user from other users and examining acoustic qualities of the voice to distinguish the voice from other voices.

14. The method of claim 10, further comprising the step of removing the correlation between the voice and user determined in said step (c) where the additional samplings in said (f) are unable to disambiguate the correlation between the voice and the user.

15. The method of claim 10, wherein said step (c) determines whether the voice is correlated to a user of the one or more users above a threshold confidence level by examining one or more of the following factors:
   i. how close the estimated position of the voice source is to the one or more users;
   ii. the number of voices which are being heard;
   iii. the closeness of the one or more users to an estimated source of the voice;
   iv. whether the source of the voice is estimated to be centered within a field of view of the image or closer to edges of the field of view.

16. A system for correlating a voice to user in a multi-user application, the system comprising:
   an image camera component capable of providing a depth image of one or more users in a field of view of the image camera component;
   a microphone array capable of receiving audio within range of the microphone array, the microphone array capable of localizing a source of a voice; and
   a computing environment in communication with both the image capture component and microphone array, the computing environment capable of distinguishing between different users in the field of view, the computing environment further performing additional samplings of data from the image camera and data from the microphone array, the additional samplings confirming the correlation of the voice with the user or the additional samplings reducing a likelihood that the voice is correlated to the user, wherein the computing environment distinguishes between different users in the field of view by detecting locations of joints of the one or more users.

17. The system of claim 16, wherein the computing environment executes a gaming application involving the one or more users while performing the initial and additional samplings.

18. The system of claim 16, wherein the microphone array uses two microphones to localize a source of the voice by time difference of arrivals of the voice to the two microphones.

* * * * *